(12) United States Patent
Sugitani et al.

(10) Patent No.: US 9,126,272 B2
(45) Date of Patent: Sep. 8, 2015

(54) WELD BEAD CUTTING DEVICE

(75) Inventors: Daichi Sugitani, Tokyo (JP); Nobuchika Suezawa, Tokyo (JP); Daisuke Sasaki, Tokyo (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 859 days.

(21) Appl. No.: 13/238,609

(22) Filed: Sep. 21, 2011

(65) Prior Publication Data
US 2012/0073132 A1  Mar. 29, 2012

(30) Foreign Application Priority Data

Sep. 24, 2010  (JP) .................................. 2010-214415

(51) Int. Cl.
*B23C 3/02* (2006.01)
*B23K 37/08* (2006.01)
(Continued)

(52) U.S. Cl.
CPC . *B23C 3/02* (2013.01); *B23K 37/08* (2013.01); *B24B 23/026* (2013.01); *B24B 23/08* (2013.01); *B24B 27/0084* (2013.01); *B24B 27/0616* (2013.01); *B24B 27/0675* (2013.01); *B24B 27/085* (2013.01); *B24D 7/18* (2013.01);
(Continued)

(58) Field of Classification Search
CPC ............ B23C 3/126; B23C 3/18; B23C 1/12; B23C 3/02; B23K 37/08; B23K 2201/001; B24B 23/026; C21D 9/50; F01D 5/005; F01D 25/285; F05D 2220/31; F05D 2230/60–2230/68; F05D 2230/70–2230/80
USPC ......... 409/131, 138, 139, 140, 178, 179, 201, 409/211, 216, 303, 297, 298–301; 83/592; 82/161, 160, 152; 30/310; 415/108, 415/189–190, 209.2–209.4, 210.1; 60/798; 29/33 A, 56.5, 525.11, 564.1, 564.3, 29/564.7, 426.1–426.6, 889.1–889.22
See application file for complete search history.

(56) References Cited

U.S. PATENT DOCUMENTS 2,735,486 A * 2/1956 Mallard .......................... 408/93
2,854,076 A * 9/1958 Keim .............................. 83/490
(Continued)

FOREIGN PATENT DOCUMENTS

CN  1699769 A   11/2005
CN  201091989 Y   7/2008
(Continued)

OTHER PUBLICATIONS

Japanese Decision to Grant a Patent issued Mar. 7, 2014 in corresponding Japanese Patent Application No. 2010-214415 with English translation.
(Continued)

*Primary Examiner* — Sarang Afzali
(74) *Attorney, Agent, or Firm* — Wenderoth, Lind & Ponack, L.L.P.

(57) ABSTRACT

A radial pin 2 has a second end portion 2B protruded from an outer surface of a turbine casing 1 and a first end portion 2A inserted into a through hole 3 formed in the turbine casing 1, and a weld bead 4 is formed on a periphery of the second end portion 2B. A weld bead cutting device 10 has a cutting portion 12 which cuts the weld bead 4 formed on the periphery of the radial pin 2, and a support portion 20 which supports the cutting portion 12 on an end surface 2C of the second end portion 2B of the radial pin 2 such that the cutting portion 12 is movable along the periphery of the radial pin 2.

8 Claims, 6 Drawing Sheets (51) Int. Cl.

| | | |
|---|---|---|
| *B24B 23/02* | (2006.01) | |
| *C21D 9/50* | (2006.01) | |
| *B24B 27/00* | (2006.01) | |
| *B24B 23/08* | (2006.01) | |
| *B24B 27/06* | (2006.01) | |
| *B24B 27/08* | (2006.01) | |
| *B24D 7/18* | (2006.01) | |
| *F01D 5/00* | (2006.01) | |
| *F01D 25/28* | (2006.01) | |

(52) U.S. Cl.
CPC ............. *C21D9/50* (2013.01); *B23K 2201/001* (2013.01); *F01D 5/005* (2013.01); *F01D 25/285* (2013.01); *F05D 2220/31* (2013.01); *Y10T 29/49229* (2015.01); *Y10T 83/02* (2015.04)

(56) References Cited

U.S. PATENT DOCUMENTS

| | | | |
|---|---|---|---|
| 2,878,626 | A | 3/1959 | Elliott |
| 7,559,142 | B2 | 7/2009 | Patel et al. |
| 2006/0191910 | A1 | 8/2006 | Fischer et al. |

FOREIGN PATENT DOCUMENTS

| | | | |
|---|---|---|---|
| CN | 101384791 | A | 3/2009 |
| CN | 201552315 | U | 8/2010 |
| JP | 56-142894 | | 10/1981 |
| JP | 57-066806 | | 4/1982 |
| JP | 61-17104 | | 1/1986 |
| JP | 61-87904 | | 5/1986 |
| JP | 2-56520 | | 4/1990 |
| JP | 4-201053 | | 7/1992 |
| JP | 7-276124 | | 10/1995 |
| JP | 9-207092 | | 8/1997 |
| KR | 10-0718001 | | 5/2007 |
| SU | 467 816 | | 4/1975 |

OTHER PUBLICATIONS

Chinese Office Action issued May 29, 2014 in corresponding Chinese Application No. 201180032306.X with English translation.
International Search Report issued Oct. 25, 2011 in corresponding International Application No. PCT/JP2011/071351.
Extended European Search Report issued Nov. 20, 2014 in corresponding EP Application No. 11826830.9 (with English translation).
Notice of Allowance issued Aug. 28, 2014 in corresponding Korean Application No. 10-2012-7034121 (with English translation).
Notice of Allowance issued Jan. 4, 2015 in corresponding Chinese Application No. 201180032306.X (with English translation).
International Preliminary Report on Patentability issued Apr. 25, 2013 in corresponding Application No. PCT/JP2011/071351 (with English translation).

* cited by examiner

WELD BEAD CUTTING DEVICE

TECHNICAL FIELD

The present invention relates to a weld bead cutting device for cutting a weld bead formed on a periphery of one end portion of a pin having the one end portion protruded from a surface of a structure and the other end portion inserted into a hole formed in the structure, and a method of removing a radial pin of a steam turbine using the weld bead cutting device.

BACKGROUND ART

Conventionally, a pin has been used for various uses such as coupling and fixing mechanical portions to each other and the like and, among them, there is a case where the pin is welded to the mechanical portion in order to prevent the removal of the pin. In this case, one end portion of the pin is inserted into a hole formed in a structure as the mechanical portion, the other end portion of the pin is protruded from the surface of the structure, and a weld bead is provided on the periphery of the other end portion. With this, the weld bead prevents the removal of the pin.

An example of the pin fixed to the structure using the weld bead in this manner includes a radial pin used for positioning a blade ring, a dummy ring, or an internal casing with respect to a turbine casing in a steam turbine in a nuclear power plant or a thermal power plant.

For example, Patent Document 1 describes a radial pin for setting the position of a blade ring or a dummy ring with respect to a rotor of a turbine. Note that, though not clearly described in Patent Document 1, in general, the radial pin has a portion protruded from an outer surface of a turbine casing, and the radial pin is fixed to the turbine casing by forming a weld bead on the periphery of the portion.

When the periodic inspection or modification of the steam turbine is carried out, there is a case where the radial pin is removed and the steam turbine is disassembled. In this case, it is necessary to remove the weld bead provided on the periphery of the radial pin, and the removal of the weld bead has been conventionally performed by the following method.

Figure 7A:
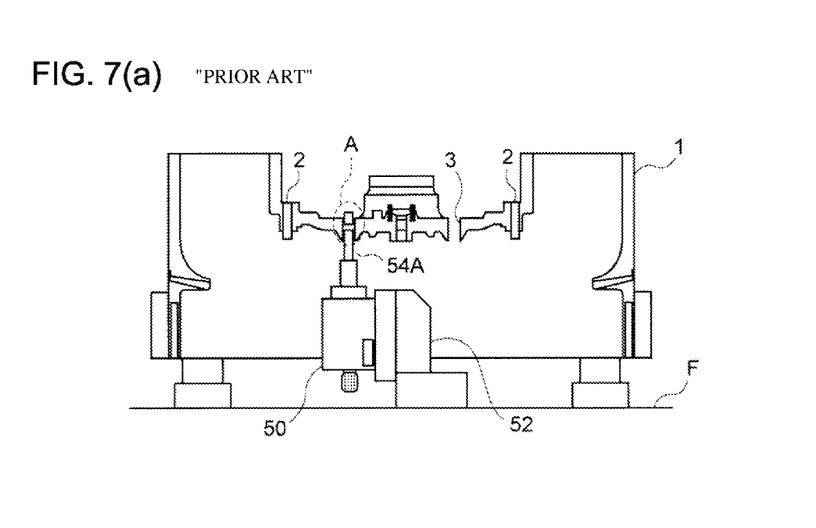
Figure 7B:
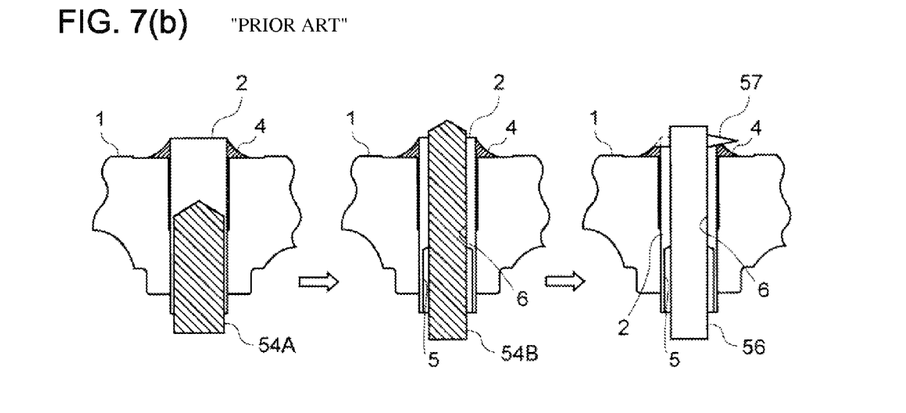
FIG. 7(b) shows an enlarged portion in the vicinity of the radial pin.

FIG. 7 is a view showing the removal of the weld bead provided on the periphery of the radial pin in which FIG. 7(a) shows an entire turbine casing, while FIG. 7(b) shows an enlarged portion in the vicinity of the radial pin (an area indicated by A of FIG. 7(a)).

As shown in FIG. 7(a), after a dedicated machine 50 is installed on a floor F via a machine installation stand 52, a turbine casing 1 is hoisted using a crane, moved to a predetermined position, and placed over the dedicated machine 50. Note that, at this stage, a large-diameter drill 54A for perforation is attached to the dedicated machine 50. On the other hand, a radial pin 2 is inserted into a through hole 3 provided in the turbine casing 1, a portion thereof is protruded from an outer surface of the turbine casing 1, and a weld bead 4 (see FIG. 7(b)) is formed on the protruded portion.

In a state where the turbine casing 1 is placed over the dedicated machine 50, as shown in FIG. 7(b), after a large diameter hole 5 is formed in the radial pin 2 from the inside of the turbine casing 1 by using the large-diameter drill 54A of the dedicated machine 50, the large-diameter drill 54A is replaced with a small-diameter drill 54B, and a through hole 6 is formed by using the small-diameter drill 54B. Herein, the reason why the two-stage perforation operation using the large-diameter and small-diameter drills 54A and 54B is performed is to prevent the displacement of the center position of the through hole 6 by using the large diameter hole 5 as a guide such that the turbine casing 1 is not damaged.

Thereafter, a cutter main body 56 is attached to the dedicated machine 50, the cutter main body 56 is inserted into the through hole 6 from the inside of the turbine casing 1, a cutting blade 57 is attached to a peripheral surface of the cutter main body 56, and the cutter main body 56 is rotated by the dedicated machine 50, whereby the cutting of the weld bead 4 is performed.

Although FIG. 7(a) shows the upper half portion of the casing having a structure divided into halves as the turbine casing 1, when the turbine casing 1 corresponds to the lower half portion of the casing, a base plate is placed on a horizontal dividing plane of the casing in spanning relation, the dedicated machine 50 is installed on the base plate via the machine installation stand 52, and the cutting of the weld bead 4 is performed according to the same procedures as those in the case of the upper half portion of the casing.

[Patent Document 1] Japanese Unexamined Utility Model Application Publication No. S61-17104

However, in the conventional method described above, in order to remove the weld bead 4, the large diameter hole 5 and the through hole 6 need to be formed in the radial pin 2 in advance so that working efficiency has been low, and there has been a possibility that the through hole 3 of the turbine casing 1 is damaged.

In addition, a large torque is required in order to form the large diameter hole 5 and the through hole 6 in the radial pin 2 so that the large dedicated machine 50 having an electric motor mounted thereon had to be used. As a result, in displacing the position of the dedicated machine 50, it has been necessary to hoist and move the dedicated machine 50 itself using the crane.

DISCLOSURE OF THE INVENTION

The present invention has been achieved in view of the above-described circumstances, and an object thereof is to provide a weld bead cutting device which is capable of cutting a weld bead without forming a through hole in a pin and has a low possibility of damage to a structure as well as having excellent working efficiency and light weight, and a method of removing a radial pin of a steam turbine using the weld bead cutting device.

The weld bead cutting device according to the present invention is a weld bead cutting device for cutting a weld bead formed on a periphery of one end portion of a pin having the one end portion protruded from a surface of a structure and the other end portion inserted into a hole formed in the structure, including a cutting unit which cuts the weld bead formed on the periphery of the pin, and a support unit which supports the cutting unit on an end surface of the one end portion of the pin such that the cutting unit is movable along the periphery of the pin.

According to the weld bead cutting device, since there is provided the support unit which supports the cutting unit which cuts the weld bead on the end surface of the pin (the end surface of the one end portion) protruded from the surface of the structure such that the cutting unit is movable along the periphery of the pin, it is possible to cut the weld bead without forming a through hole in the pin, and significantly improve working efficiency.

In addition, the through hole is not formed in the pin so that it is possible to reduce the possibility of damage to the structure, and a small torque is sufficient for the weld bead cutting device so that it is possible to adopt a lightweight configuration using, e.g., an air grinder or the like.

In the above-described weld bead cutting device, the support unit preferably includes a support shaft provided to stand on the end surface of the one end portion of the pin, a coupling member which couples the cutting unit to the support shaft, and a bearing which supports the coupling member such that the coupling member is pivotable about the support shaft.

In this manner, by supporting the cutting unit by using the support unit including the support shaft, the coupling member, and the bearing, it is possible to cause the cutting unit to pivot about the support shaft together with the coupling member to smoothly move the cutting unit along the periphery of the pin. With this, it becomes easy to cut the weld bead formed on the periphery of the pin without damaging the structure.

In the above-described weld bead cutting device, the support shaft is preferably screwed to a screw hole formed in the end surface of the one end portion of the pin, the screw hole being a circle generally concentric with a circular shape of a cross section of the pin.

In this manner, the support shaft is screwed to the screw hole which is formed in the end surface of the pin (the end surface of the one end portion) protruded from the surface of the structure and is the circle generally concentric with the circular shape of the cross section of the pin, whereby it is possible to move the cutting unit at a desired locus along the periphery of the pin by causing the cutting unit to pivot about the support shaft together with the coupling member. With this, it is possible to prevent damage to the structure during the cutting of the weld bead.

In the above-described weld bead cutting device, the cutting unit may have a cutting blade for cutting the weld bead on a tip side in its longitudinal direction, and the cutting unit may be attached to the coupling member such that an angle formed by the longitudinal direction of the cutting unit and the support shaft is not less than 0 degrees and not more than 60 degrees.

In this case, the above-described weld bead cutting device preferably includes an angle adjustment unit which adjusts the angle formed by the longitudinal direction of the cutting unit and the support shaft.

In this manner, by setting the angle formed by the longitudinal direction of the cutting unit and the support shaft to not less than 0 degrees and not more than 60 degrees, it is possible to easily perform a cutting operation of the weld bead using the cutting blade of the cutting unit. In addition, by providing the angle adjustment unit, it is possible to bring the cutting unit into contact with the weld bead at an appropriate angle constantly in accordance with the progress of the cutting operation of the weld bead.

The above-described weld bead cutting device preferably further includes a radial position adjustment unit which adjusts a position of the cutting unit in a radial direction of the pin.

In addition, the above-described weld bead cutting device preferably further includes an axial position adjustment unit which adjusts a position of the cutting unit in an axial direction of the pin.

In this manner, by providing the radial position adjustment unit which adjusts the position of the cutting unit in the radial direction of the pin or the axial position adjustment unit which adjusts the position of the cutting unit in the axial direction of the pin, it is possible to bring the cutting unit into contact with the weld bead at an appropriate position constantly in accordance with the progress of the cutting operation of the weld bead.

In the above-described weld bead cutting device, the structure may be a turbine casing of a steam turbine, and the pin may be a radial pin for positioning a blade ring, a dummy ring, or an internal casing of the steam turbine with respect to the turbine casing.

The method of removing a radial pin of a steam turbine according to the present invention is a method of removing a radial pin for positioning a blade ring, a dummy ring, or an internal casing of a steam turbine with respect to a turbine casing of the steam turbine by using the above-described weld bead cutting device, the radial pin having one end portion protruded from an outer surface of the turbine casing and the other end portion inserted into a hole formed in the turbine casing and being fixed to the turbine casing by forming a weld bead on a periphery of the protruded portion, the method including the steps of attaching the cutting unit to an end surface of the one end portion of the radial pin via the support unit, cutting the weld bead while moving the cutting unit along the periphery of the radial pin, and removing the radial pin from the turbine casing after cutting the weld bead.

According to the method of removing the radial pin, since the cutting unit is attached to the end surface of the pin (the end surface of the one end portion) protruded from the surface of the turbine casing via the support unit and the cutting of the weld bead is performed while the cutting unit is moved along the periphery of the radial pin, it is possible to omit an operation for forming a through hole in the radial pin, and significantly improve working efficiency.

In addition, the through hole is not formed in the radial pin so that it is possible to reduce the possibility of damage to the turbine casing (particularly a through hole for attaching the radial pin), and a small torque is sufficient for the weld bead cutting device so that it is possible to adopt a lightweight configuration using, e.g., an air grinder or the like. Further, the radial pin is not ruptured so that it is possible to reuse the radial pin.

In a conventional method of removing a radial pin of a steam turbine, when the turbine casing corresponds to the upper half portion of the casing, the turbine casing (the upper half portion of the casing) has been hoisted using a crane and placed over a dedicated machine installed on a floor in advance, a through hole has been formed in the radial pin from the inside the casing by a two-stage perforation operation using the dedicated machine, and the cutting of the weld bead has been performed by using a cutting blade inserted into the through hole. Further, when a plurality of radial pins are sequentially removed, it has been necessary to hoist and reverse the turbine casing (the upper half portion of the casing) and move a machine installation stand and the dedicated machine in order to displace the position of the dedicated machine for the next radial pin to be removed.

On the other hand, when the turbine casing corresponds to the lower half portion of the casing, a base plate has been placed on a horizontal dividing plane of the lower half portion of the casing in spanning relation, the dedicated machine has been installed on the base plate via the machine installation stand, and the cutting of the weld bead has been performed according to the same procedures as those in the case of the upper half portion of the casing. In addition, when the removal operation of the next radial pin is started, it has been necessary to hoist the dedicated machine using the crane to move the dedicated machine to the position of the next radial pin to be removed.

In contrast to this, in the above-described method of removing the radial pin according to the present invention, since the cutting of the weld bead is performed with the cutting unit attached to the end surface of the pin (the end surface of the one end portion) protruded from the surface of the turbine casing via the support unit, the operation can be performed from the outside of the turbine casing so that it is not necessary to hoist the turbine casing (the upper half portion of the casing) and place the turbine casing over the dedicated machine using the crane, as in the conventional case.

In addition, as described above, since the weld bead cutting device according to the present invention is lightweight and portable, when the removal operation of the next radial pin is started, it is sufficient to merely carry the weld bead cutting device to the position of the next radial pin to be removed, and it is not necessary to hoist or reverse the turbine casing (the upper half portion of the casing), or move the machine installation stand and the dedicated machine using the crane.

In the above-described method of removing the radial pin, the cutting unit preferably has a cutting blade for cutting the weld bead on a tip side in its longitudinal direction, and, in the step of cutting the weld bead, the weld bead is preferably roughly cut while the cutting unit is moved inwardly in a radial direction of the radial pin in a state where the longitudinal direction of the cutting unit is generally in parallel with the support shaft, and then the weld bead is preferably cut in a state where the longitudinal direction of the cutting unit is inclined relative to the support shaft.

In this manner, the weld bead is roughly cut while the cutting unit is moved inwardly in the radial direction of the radial pin in the state where the longitudinal direction of the cutting unit is generally in parallel with the support shaft, and then the weld bead is cut in the state where the longitudinal direction of the cutting unit is inclined relative to the support shaft, whereby it is possible to speedily remove the weld bead with high precision.

According to the present invention, since there is provided the support unit which supports the cutting unit which cuts the weld bead on the end surface of the pin (the end surface of the one end portion) protruded from the surface of the structure such that the cutting unit is movable along the periphery of the pin, it is possible to cut the weld bead without forming the through hole in the pin, and significantly improve working efficiency.

In addition, the through hole is not formed in the pin so that it is possible to reduce the possibility of damage to the structure, and a small torque is sufficient for the weld bead cutting device so that it is possible to adopt a lightweight configuration using, e.g., an air grinder or the like.

BRIEF DESCRIPTION OF THE DRAWINGS

FIG. 7 is a view showing the removal of a weld bead provided on a periphery of a radial pin in a conventional method of removing the radial pin in which FIG. 7(a) shows an entire turbine casing, while

MODE FOR CARRYING OUT THE INVENTION

A description is given hereinbelow of embodiments of the present invention with reference to the accompanying drawings. Note that the scope of the present invention is not limited to dimensions, materials, shapes, and relative arrangements of constituent parts described in the embodiments unless specifically described, and they are only explanatory examples.

Figure 1:
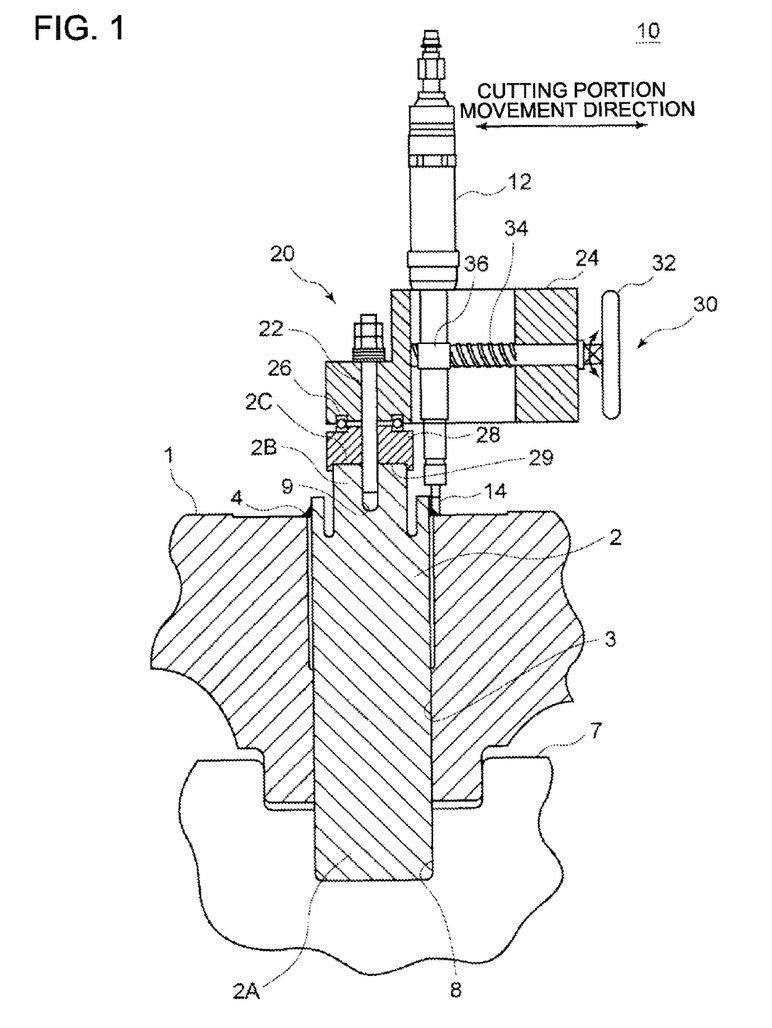
FIG. 1 is a cross-sectional view showing an example of a configuration of a weld bead cutting device.
Figure 2:
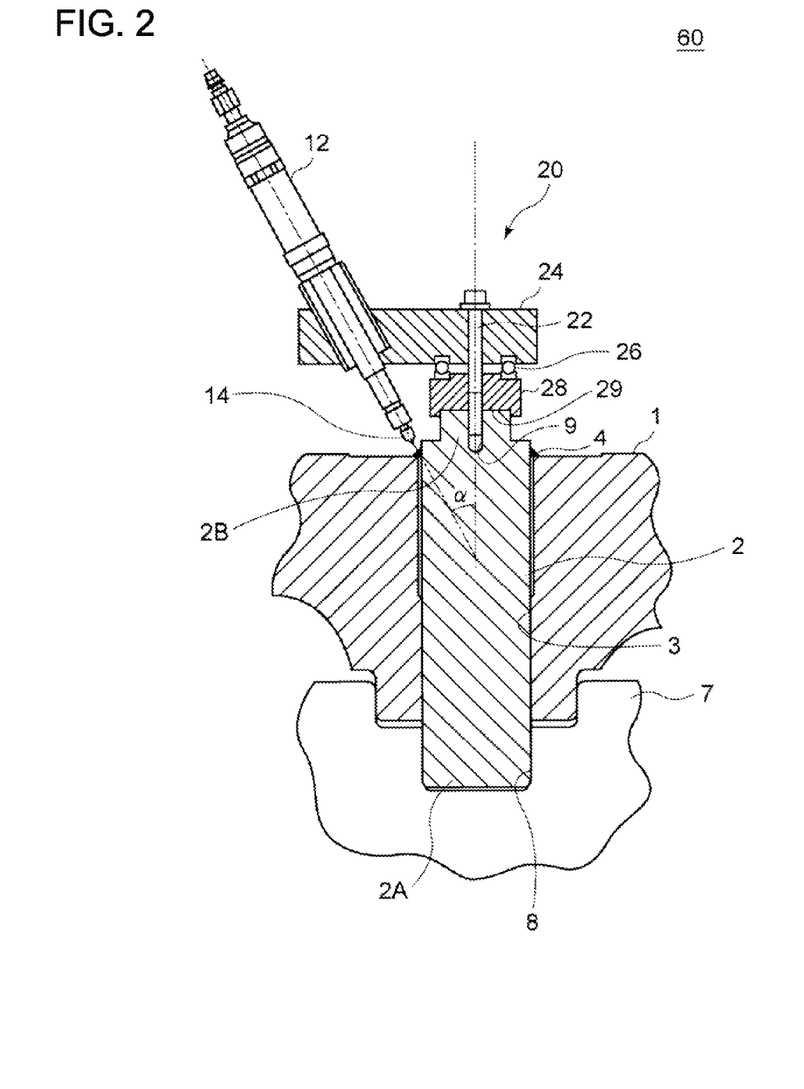
FIG. 2 is a cross-sectional view showing another example of the weld bead cutting device.

FIG. 1 is a cross-sectional view showing an example of a configuration of a weld bead cutting device. FIG. 2 is a cross-sectional view showing another example of the weld bead cutting device shown in FIG. 1.

Although a description is given hereinbelow of the weld bead cutting device for cutting a weld bead 4 of a radial pin 2 used for positioning an in-casing structure (a blade ring, a dummy ring, or an internal casing) 7 of a steam turbine with respect to a turbine casing 1, the weld bead cutting device of the present invention is not limited to the example, and can be widely applied to a device for cutting a weld bead of a pin which has a portion protruded from a surface of a structure and has the weld bead formed on a periphery of the protruded portion.

As shown in FIG. 1, a first end portion (corresponding to "the other end portion") 2A of the radial pin 2 is inserted into a through hole 3 formed in the turbine casing 1, and fitted in a concave portion 8 provided in the in-casing structure (the blade ring, the dummy ring, or the internal casing) 7. On the other hand, a second end portion (corresponding to "one end portion") 2B of the radial pin 2 is protruded from an outer surface of the turbine casing 1, and the weld bead 4 is formed on its periphery. By the weld bead 4, the radial pin 2 is fixed to the turbine casing 1. In addition, the weld bead 4 in a steam turbine also plays a role of sealing the internal space of the turbine casing 1 to prevent the passage of a fluid (steam or air) between the inside and the outside of the turbine casing 1 via the through hole 3.

A weld bead cutting device 10 shown in FIG. 1 includes a cutting portion (a cutting unit) 12 which cuts the weld bead 4 formed on the periphery of the radial pin 2, and a support portion (a support unit) 20 which supports the cutting portion 12 on the radial pin 2.

The cutting portion 12 has a cutting blade 14 for cutting the weld bead 4 on a tip side in its longitudinal direction, and, e.g., an air grinder driven by factory air or the like can be used as the cutting portion 12.

The support portion 20 which supports the cutting portion 12 has a support shaft 22 which is provided to stand on an end surface 2C of the one end portion 2B of the radial pin 2, a coupling member 24 which couples the cutting portion 12 to the support shaft 22, a bearing 26 which supports the coupling member 24 such that the coupling member 24 is pivotable about the support shaft 22, and a fitting member 28 which fits over the one end portion 2B of the radial pin 2.

The support shaft 22 extends through the coupling member 24 and the fitting member 28, and is screwed to a screw hole 9 provided in the end surface 2C of the one end portion 2B of the radial pin 2.

The screw hole 9 is preferably formed in the end surface 2C as a circle generally concentric with a circular shape of a cross section of the radial pin 2. With this, by causing the cutting portion 12 to pivot about the support shaft 22 together with the coupling member 24, it is possible to move the cutting portion 12 (the cutting blade 14) at a desired locus along the periphery of the radial pin 2. Therefore, it is possible to prevent damage to the turbine casing 1 during the cutting of the weld bead 4.

The coupling member 24 has a screw-nut system (a radial position adjustment unit) 30 therein, and is capable of adjusting the position of the cutting portion 12 (the cutting blade 14) in a radial direction of the radial pin 2. With this, in accordance with the progress of a cutting operation of the weld bead 4, it is possible to bring the cutting blade 14 of the cutting portion 12 into contact with the weld bead 4 at an appropriated position constantly.

The screw-nut system 30 has a handle 32 attached to its end portion, and includes a feed screw 34 which extends along the radial direction of the radial pin 2, and a feed nut 36 to which the cutting portion 12 is attached. The feed screw 34 is held to the coupling member 24 by a bearing which is not shown so as to be rotatable with the handle 32. According to the screw-nut system 30, when a torque is inputted to the feed screw 34 via the handle 32, the cutting portion 12 moves in the radial direction of the radial pin 2 (a "cutting portion movement direction" shown in FIG. 1) together with the feed nut 36 as the feed screw 34 rotates.

The bearing 26 is provided between the coupling member 24 and the fitting member 28, and supports the coupling member 24 such that the coupling member 24 is pivotable about the support shaft 22 relative to the fitting member 28.

Note that, since the fitting member 28 fits over the one end portion 2B of the radial pin 2, the fitting member 28 is basically immovable during the pivoting of the coupling member 24. Specifically, the one end portion 2B of the radial pin 2 has a polygonal shape (e.g., a hexagonal shape) having the axial direction of the radial pin 2 as its center, the fitting member 28 has a concave portion 29 in a shape corresponding to the polygonal shape, and the fitting member 28 is locked by the one end portion 2B of the radial pin 2.

In this manner, by supporting the cutting portion 12 by using the support portion 20 including the support shaft 22, the coupling member 24, and the bearing 26, it is possible to cause the cutting portion 12 to pivot about the support shaft 22 together with the coupling member 24 to smoothly move the cutting blade 14 of the cutting portion 12 along the periphery of the radial pin 2. With this, it becomes easy to cut the weld bead 4 formed on the periphery of the radial pin 2 without damaging the turbine casing 1.

Note that, in the example shown in FIG. 1, although the cutting portion 12 is attached to the coupling member 24 such that the longitudinal direction thereof is along the axial direction of the radial pin 2 (the axial direction of the support shaft 22), as shown in FIG. 2, the cutting portion 12 may be attached to the coupling member 24 in a state where the cutting portion 12 is inclined relative to the axial direction of the radial pin 2 (the axial direction of the support shaft 22). Herein, a weld bead cutting device 60 shown in FIG. 2 has the same configuration as that of the weld bead cutting device 10 of FIG. 1 except for the attachment implementation (an angle) of the cutting portion 12, and hence the description of the components which are the same as those of the weld bead cutting device 10 is omitted by retaining the same reference numerals.

In addition, in terms of facilitation of the cutting operation of the weld bead 4 using the cutting blade 14, the cutting portion 12 is preferably attached to the coupling member 24 such that an angle α (see FIG. 2) formed by the longitudinal direction of the cutting portion 12 and the axial direction of the support shaft 22 is not less than 0 degrees and not more than 60 degrees. Note that, in the weld bead cutting device 10 shown in FIG. 1, the angle a formed by the longitudinal direction of the cutting portion 12 and the axial direction of the support shaft 22 is 0 degrees.

Figure 3:
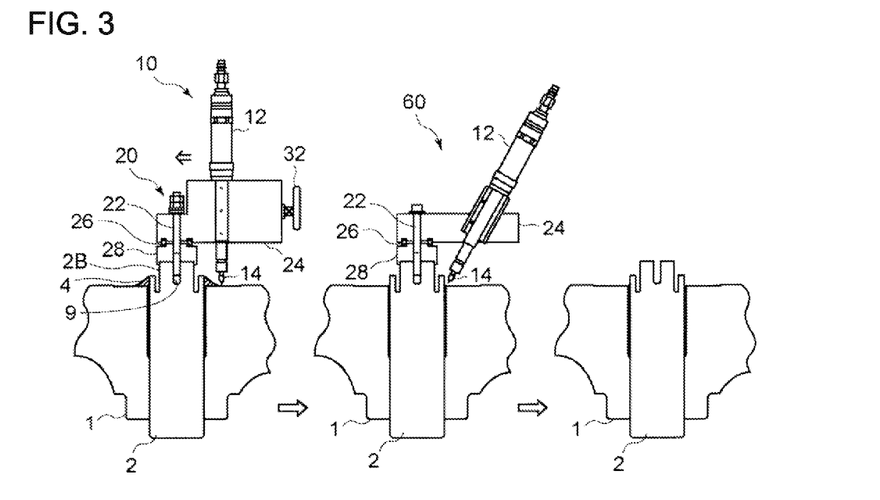
FIG. 3 is a view showing the removal of a radial pin of a steam turbine by using the weld bead cutting device shown in FIGS. 1 and 2.
Figure 4:
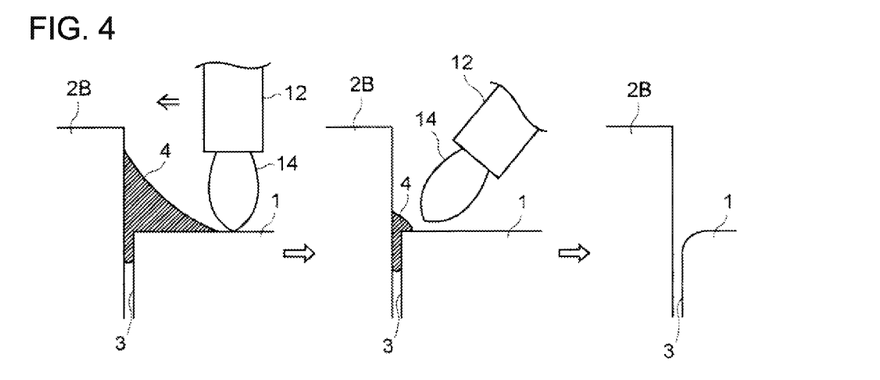
FIG. 4 is an enlarged view showing a portion in the vicinity of a weld bead in each stage of FIG. 3.

Next, a description is given of a method of removing the radial pin 2 of the steam turbine by using the weld bead cutting device 10 shown in FIGS. 1 and 2. FIG. 3 is a view showing the removal of the radial pin 2 of the steam turbine. FIG. 4 is an enlarged view showing the portion in the vicinity of the weld bead 4 in each stage of FIG. 3.

First, as shown in FIG. 3, the weld bead cutting device 10 is attached to the end surface 2C of the one end portion 2B of the radial pin 2.

Specifically, as shown in FIG. 1, the coupling member 24, the fitting member 28, and the bearing 26 are pre-assembled together, and the cutting portion 12 is attached to the coupling member 24 in advance. Subsequently, the one end portion 2B of the radial pin 2 is fitted in the concave portion 29 of the fitting member 28. In this state, the support shaft 22 is inserted into through holes (not shown) provided in the coupling member 24 and the fitting member 28, and is screwed to the screw hole 9 provided in the one end portion 2B of the radial pin 2.

Then, in a state where the longitudinal direction of the cutting portion 12 is generally in parallel with the support shaft 22, while the cutting portion 12 is moved inwardly in the radial direction of the radial pin 2 (a direction of an arrow of FIG. 4), the weld bead 4 is roughly cut by causing the cutting portion 12 (the cutting blade 14) to pivot along the periphery of the radial pin 2. With this, most of the weld bead 4 is removed, but the weld bead 4 having entered into a gap between the through hole 3 of the turbine casing 1 and the one end portion 2B of the radial pin 2 remains without being removed.

Thereafter, as shown in FIG. 3, instead of the weld bead cutting device 10, the weld bead cutting device 60 is attached to the end surface 2C of the one end portion 2B of the radial pin 2. The specific attachment procedures are the same as those in the case of the weld bead cutting device 10.

Subsequently, in a state where the longitudinal direction of the cutting portion 12 is inclined relative to the support shaft 22, the cutting portion 12 (the cutting blade 14) is caused to pivot along the periphery of the radial pin 2, and the remaining weld bead 4 is cut.

In this manner, the weld bead 4 is roughly cut by using the weld bead cutting device 10 while the cutting portion 12 is moved inwardly in the radial direction of the radial pin 2 in the state where the longitudinal direction of the cutting portion 12 is generally in parallel with the support shaft 22, and then the weld bead 4 is cut by using the weld bead cutting device 60 in the state where the longitudinal direction of the cutting portion 12 is inclined relative to the support shaft 22, whereby it is possible to speedily remove the weld bead 4 with high precision.

Then, the radial pin 2 from which the weld bead 4 has been completely removed is struck with a hammer or the like to be removed from the through hole 3 of the turbine casing 1, a hook is attached to the radial pin 2 by utilizing the screw hole 9 provided in the end surface 2C of the one end portion 2B of the radial pin 2, and the radial pin 2 is hoisted using a crane. In this manner, the radial pin 2 is removed from the through hole 3 of the turbine casing 1.

As has been described above, each of the weld bead cutting devices 10 and 60 of the present embodiment has the cutting portion 12 which cuts the weld bead 4 formed on the periphery of the radial pin 2, and the support portion 20 which supports the cutting portion 12 on the end surface 2C of the one end portion 2B of the radial pin 2 such that the cutting portion 12 is movable along the periphery of the radial pin 2.

In addition, the support portion 20 includes the support shaft 22 which is provided to stand on the end surface 2C of the one end portion 2B of the radial pin 2, the coupling member 24 which couples the cutting portion 12 to the support shaft 22, and the bearing 26 which supports the coupling member 24 such that the coupling member 24 is pivotable about the support shaft 22.

Thus, in each of the weld bead cutting devices 10 and 60, since there is provided the support portion 20 which supports the cutting portion 12 (the cutting blade 14) which cuts the weld bead 4 on the end surface 2C of the radial pin 2 (the end surface of the one end portion 2B) such that the cutting portion 12 is movable along the periphery of the radial pin 2, it is possible to cut the weld bead 4 without forming the through hole in the radial pin 2, and significantly improve working efficiency.

In addition, the through hole is not formed in the radial pin 2 so that it is possible to reduce the possibility of damage to the turbine casing 1 (specifically, the through hole 3), and a small torque is sufficient for the cutting portion 12 of each of the weld bead cutting devices 10 and 60 so that it is possible to adopt a lightweight configuration using, e.g., an air grinder or the like.

In the present embodiment, the description has been given of the method of removing the radial pin in which, after the weld bead cutting device 10 is attached to the end surface 2C of the one end portion 2B of the radial pin 2 in the beginning and the weld bead 4 is roughly cut while the cutting portion 12 is moved inwardly in the radial direction of the radial pin 2 in the state where the longitudinal direction of the cutting portion 12 is generally in parallel with the support shaft 22, the weld bead cutting device 60 is attached to the end surface 2C of the one end portion 2B of the radial pin 2 instead of the weld bead cutting device 10, the weld bead 4 is cut in the state where the longitudinal direction of the cutting portion 12 is inclined relative to the support shaft 22, and lastly the radial pin 2 from which the weld bead 4 has been completely removed is removed from the through hole 3 of the turbine casing 1.

According to the method of removing the radial pin, since the weld bead 4 is cut by using each of the weld bead cutting devices 10 and 60 and attaching the cutting portion 12 to the end surface 2C of the radial pin 2 (the end surface of the one end portion 2B) protruded from the outer surface of the turbine casing 1 via the support portion 20, it is possible to perform the operation from the outside of the turbine casing 1.

In addition, since the weld bead cutting devices 10 and 60 are lightweight and portable, when the removal operation of the next radial pin 2 is started, it is sufficient to merely carry the weld bead cutting devices 10 and 60 to the position of the next radial pin 2 to be removed, and it is not necessary to hoist or reverse the turbine casing 1, or move the machine installation stand and the dedicated machine using the crane.

Although the embodiment of the present invention has been described in detail thus far, the present invention is not limited thereto, and it will be evident that various modifications and changes may be made without departing from the gist of the present invention.

For example, in the embodiment described above, although the description has been given of the example in which the cutting portion 12 is supported on the end surface 2C of the radial pin 2 by the support portion 20 including the support shaft 22, the coupling member 24, the bearing 26, and the fitting member 28, the support portion which supports the cutting portion 12 is not limited to this example, and various configurations thereof can be adopted as shown below.

Figure 5:
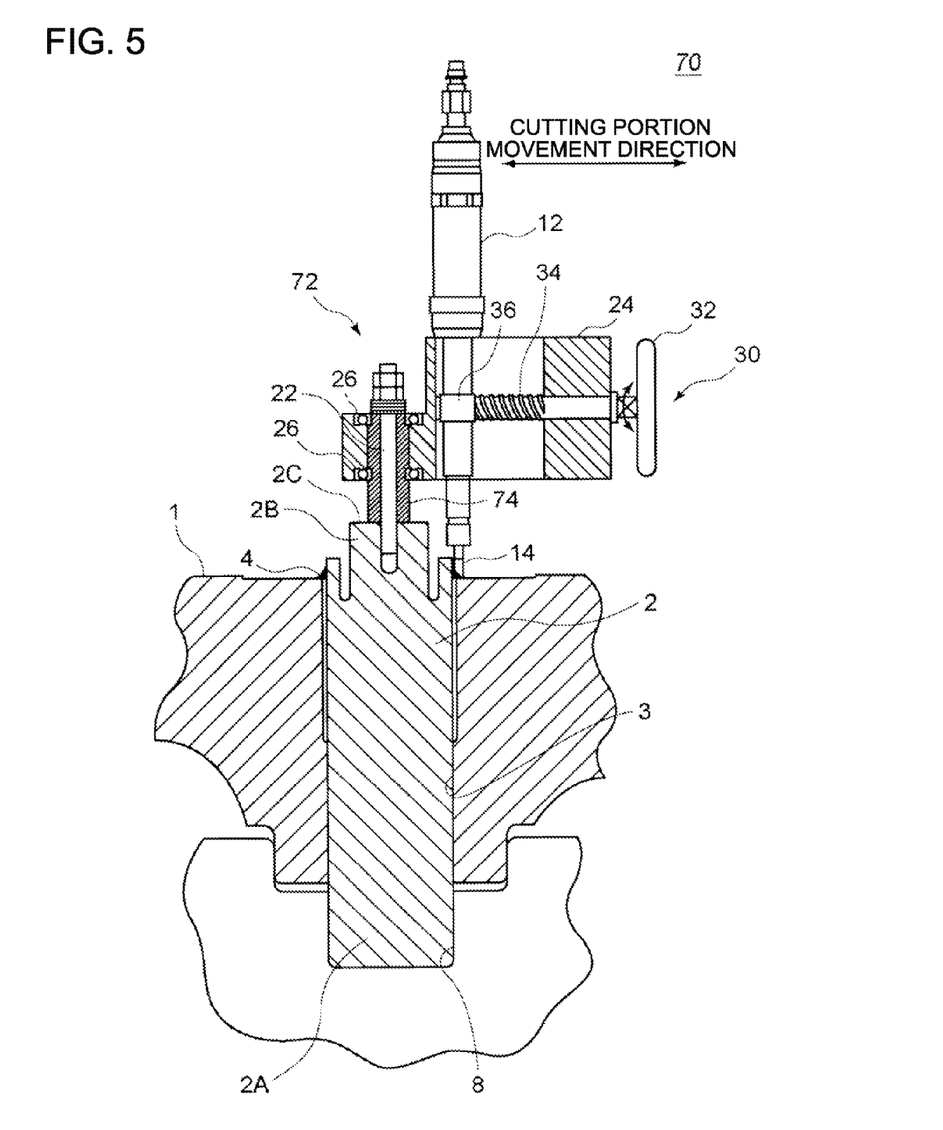
FIG. 5 is a cross-sectional view showing a configuration of a weld bead cutting device according to a modification.

FIG. 5 is a cross-sectional view showing a configuration of a weld bead cutting device according to a modification. A weld bead cutting device 70 shown in the drawing is the same as the weld bead cutting device 10 described in the first embodiment except for the configuration of the support portion which supports the cutting portion 12 so that the description of the components which are the same as those of the weld bead cutting device 10 is omitted by retaining the same reference numerals.

As shown in FIG. 5, a support portion 72 of the weld bead cutting device 70 has the support shaft 22 which is provided to stand on the end surface 2C of the one end portion 2B of the radial pin 2, a sleeve 74 which is provided on the periphery of the support shaft 22 along the support shaft 22, the coupling member 24 which couples the cutting portion 12 to the support shaft 22 (the sleeve 74), and the bearings 26 which support the coupling member 24 such that the coupling member 24 is pivotable about the support shaft 22. According to the support portion 72 having such configuration, similarly to the support portion 20 described in the above embodiment, it is possible to smoothly move the cutting blade 14 of the cutting portion 12 along the periphery of the radial pin 2.

Further, the support portion which supports the cutting portion 12 can have any configuration as long as the support portion can support the cutting portion 12 on the end surface 2C of the radial pin 2 such that the cutting portion 12 is movable along the periphery of the radial pin 2. For example, a slide bearing may be used instead of the bearing 26, and the bearing 26 itself may be omitted. When the bearing 26 is omitted, one of a circular concave portion and a circular convex portion is provided in a member which does not rotate, the other one of the concave and convex portions is provided in a member which rotates, and rotation is regulated by fitting the concave and convex portions of the members to each other, whereby it is possible to cause the cutting portion 12 to properly pivot along a predetermined locus.

Furthermore, in the embodiment described above, although the description has been given of the example in which the position of the cutting portion 12 in the radial direction of the radial pin 2 is adjusted by the screw-nut system (the radial position adjustment unit) 30 in the weld bead cutting device 10, there may be provided an angle adjustment unit which adjusts an angle formed by the longitudinal direction of the cutting portion 12 and the support shaft 22, and an axial position adjustment unit which adjusts the position of the cutting portion 12 in the axial direction of the support shaft 22.

Figure 6:
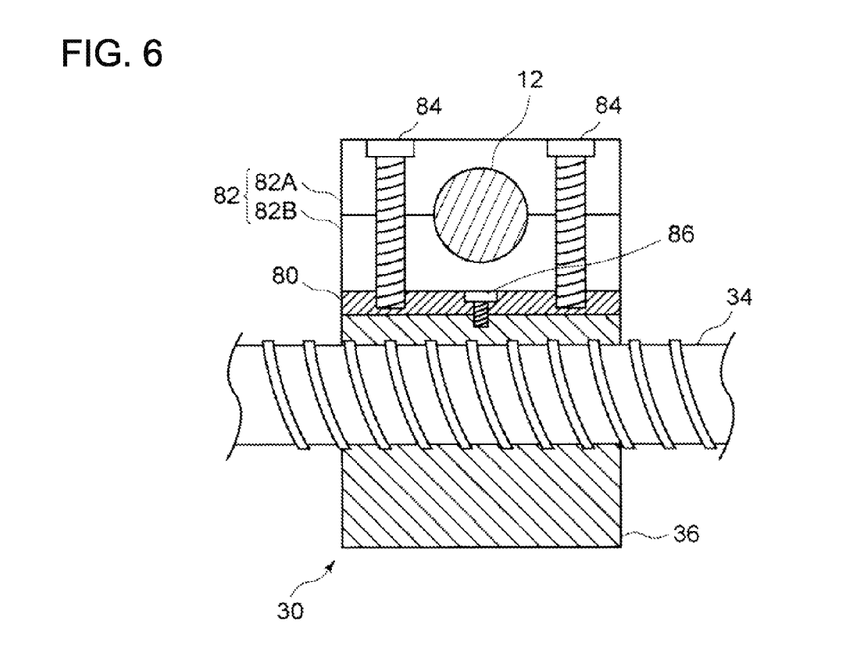
FIG. 6 is a cross-sectional view showing an example of a configuration of each of an angle adjustment unit and an axial position adjustment unit.

FIG. 6 is a cross-sectional view showing an example of a configuration of each of the angle adjustment unit and the axial position adjustment unit. As shown in the drawing, to the feed nut 36 of the screw-nut system 30, a cutting portion holder 82 is attached via a backing plate 80. The cutting portion holder 82 fixes the cutting portion 12 by holding the cutting portion 12 in a circular hole formed by disposing a first plate portion 82A and a second plate portion 82B having semicircular grooves such that the respective semicircular grooves oppose each other, and tightening the first and second plate portions 82A and 82B by using a pair of bolts (the axial position adjustment unit) 84. In addition, the cutting portion holder 82 is fixed to the backing plate 80 using the bolts 84. The backing plate 80 is fixed to the feed nut 36 using a bolt (the angle adjustment unit) 86.

After the backing plate 80 is rotated about the bolt 86 by a desired angle in a state where the bolt 86 is loosened, the bolt 86 is tightened and the cutting portion holder 82 and the cutting portion 12 are attached to the backing plate 80, whereby it is possible to adjust the angle formed by the longitudinal direction of the cutting portion 12 and the support shaft 22.

In addition, after the cutting portion 12 is moved along its longitudinal direction by a desired amount in a state where the bolts 84 are loosened, the bolts 84 are tightened, whereby it is possible to adjust the position of the cutting portion 12 (the cutting blade 14) in the axial direction of the support shaft 22.

With this, it is possible to bring the cutting portion 12 into contact with the weld bead 4 at an appropriate angle and position constantly in accordance with the progress of the cutting operation of the weld bead 4. Further, when the configuration is adopted in which the angle formed by the longitudinal direction of the cutting portion 12 and the support shaft 22 can be adjusted using the bolt 86, as described in the above embodiment, the necessity to replace the weld bead cutting device 10 with the weld bead cutting device 60 is obviated so that it is possible to reliably remove the weld bead 4 by using the single weld bead cutting device.

The invention claimed is:

1. A weld bead cutting device for cutting a weld bead formed on a periphery of one end portion of a pin having the one end portion protruded from a surface of a structure and the other end portion inserted into a hole formed in the structure, comprising:
   a cutting unit which cuts the weld bead formed on the periphery of the pin; and
   a support unit which supports the cutting unit on an end surface of the one end portion of the pin such that the cutting unit is movable along the periphery of the pink wherein the support unit includes:
   a fitting member configured to be fitted over and locked by the one end portion of the pin; and
   a coupling member which is configured to be pivotable with respect to the fitting member and to which the cutting unit is attached;
   a support shaft provided to stand on the end surface of the one end portion of the pin; and
   a bearing provided between the coupling member and the fitting member which supports the coupling member such that the coupling member is pivotable about the support shaft relative to the fitting member.

2. The weld bead cutting device according to claim 1, wherein the support shaft is screwed to a circular screw hole formed in the end surface of the one end portion of the pin, and the pin has a circular cross section which is generally concentric with the circular screw hole.

3. The weld bead cutting device according to claim 1, wherein
   the cutting unit has a cutting blade for cutting the weld bead on a tip side in a longitudinal direction of the cutting unit, and
   the cutting unit is attached to the coupling member such that an angle formed by a longitudinal direction of the cutting unit and the support shaft is not less than 0 degrees and not more than 60 degrees.

4. The weld bead cutting device according to claim 1, further comprising:
   an angle adjustment unit which adjusts an angle formed by a longitudinal axis of the cutting unit and the support shaft.

5. The weld bead cutting device according to claim 1, further comprising:
   a radial position adjustment unit which adjusts a position of the cutting unit in a radial direction of the pin, wherein the pin extends in an axial direction and the radial direction of the pin extends in a plane perpendicular to the axial direction.

6. The weld bead cutting device according to claim 1, further comprising:
   an axial position adjustment unit which adjusts a position of the cutting unit in a direction along an axial axis of the pin.

7. The weld bead cutting device according to claim 1, wherein
   the structure is a turbine casing of a steam turbine, and
   the pin is a radial pin for positioning a blade ring, a dummy ring, or an internal casing of the steam turbine with respect to the turbine casing.

8. The weld bead cutting device according to claim 1, wherein the cutting unit is an air grinder having a cutting blade for cutting the weld bead.

* * * * *